United States Patent
Ng et al.

(10) Patent No.: US 7,549,782 B2
(45) Date of Patent: Jun. 23, 2009

(54) SEMICONDUCTOR LIGHT SOURCE CONFIGURED AS A LIGHT TUBE

(75) Inventors: Kee Yean Ng, Taman Inderawasih (MY); Sian Tatt Lee, Pulau Tikus (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 40 days.

(21) Appl. No.: 11/432,833

(22) Filed: May 11, 2006

(65) Prior Publication Data

US 2007/0263405 A1 Nov. 15, 2007

(51) Int. Cl.
*H01L 33/00* (2006.01)

(52) U.S. Cl. .................. 362/555; 362/551; 362/26; 362/27; 362/84; 362/558; 362/552; 362/553; 362/582; 362/583

(58) Field of Classification Search ................. 362/555, 362/551, 800, 26, 27, 84, 231, 293, 552, 362/553, 558, 582, 583
See application file for complete search history.

(56) References Cited

U.S. PATENT DOCUMENTS

| | | | | |
|---|---|---|---|---|
| 5,383,100 A | * | 1/1995 | Kikos | 362/34 |
| 5,436,805 A | * | 7/1995 | Hsu et al. | 362/559 |
| 6,014,489 A | * | 1/2000 | Johanson | 385/133 |
| 6,299,338 B1 | * | 10/2001 | Levinson et al. | 362/559 |
| 6,337,946 B1 | * | 1/2002 | McGaffigan | 362/555 |
| 6,488,397 B1 | * | 12/2002 | Masutani et al. | 362/551 |
| 6,910,783 B2 | | 6/2005 | Mezei | |
| 7,300,192 B2 | | 11/2007 | Mueller | |
| 2004/0066659 A1 | * | 4/2004 | Mezei et al. | 362/555 |
| 2004/0130909 A1 | * | 7/2004 | Mueller et al. | 362/555 |
| 2007/0081329 A1 | * | 4/2007 | Chua et al. | 362/231 |

* cited by examiner

*Primary Examiner*—Sandra L O'Shea
*Assistant Examiner*—Jessica L McMillan

(57) ABSTRACT

A tubular light source having a semiconductor light source and a tube is disclosed. The tube includes a transparent medium, the tube having a side tube surface, a center curve, one end surface, a length, and a maximum cross-sectional dimension. The tube includes scattering centers that cause light traveling in the tube to be reflected at angles such that the reflected light leaves the tube through the side tube surface. The semiconductor light source is positioned to emit light into the tube within a cone of angles such that the light will not leave the side tube surface in the absence of the scattering centers. The scattering centers can be dispersed in the transparent medium or located on the side tube surface. The transparent medium can be rigid or flexible.

15 Claims, 4 Drawing Sheets

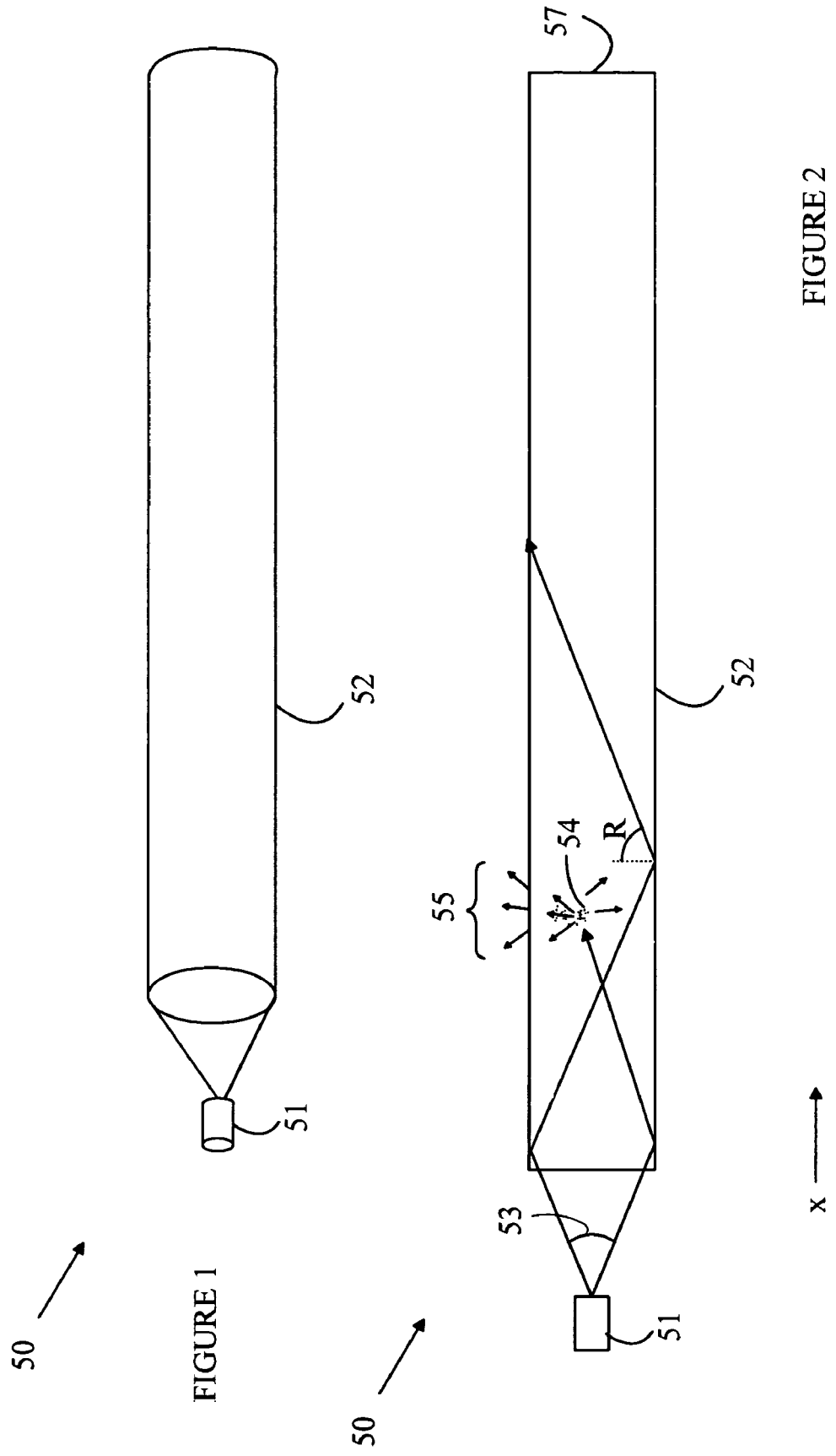

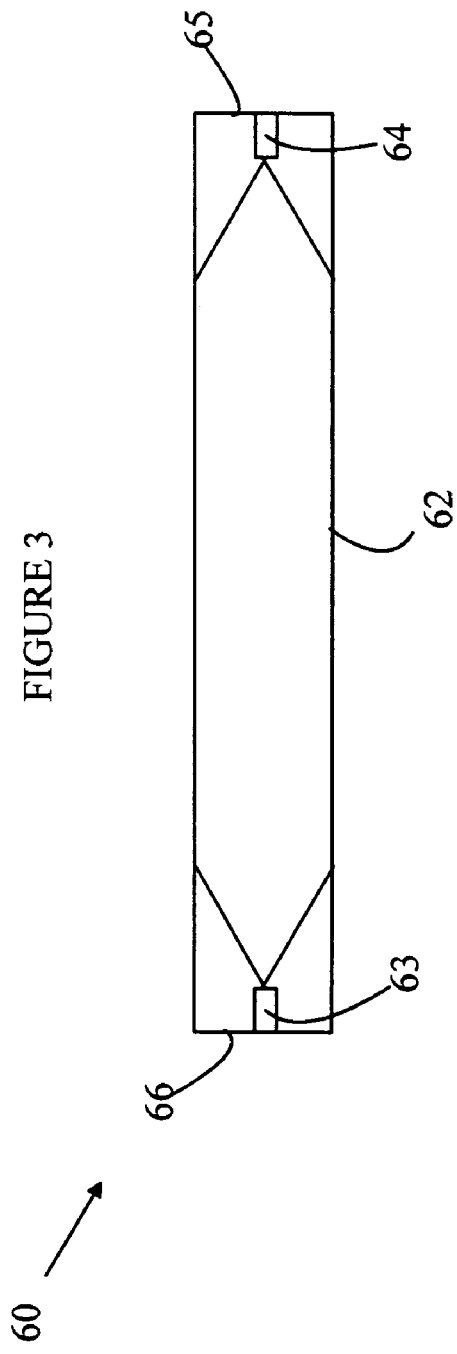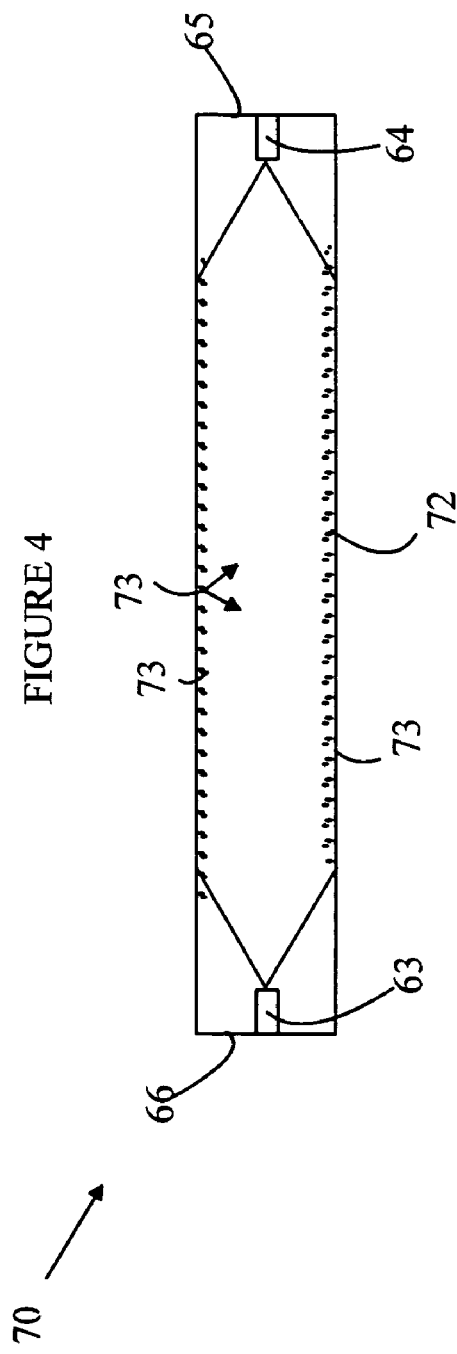

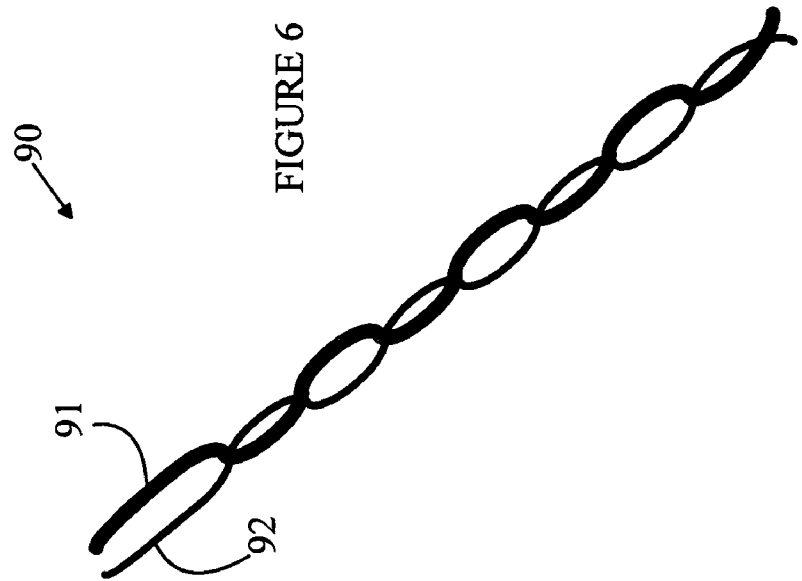
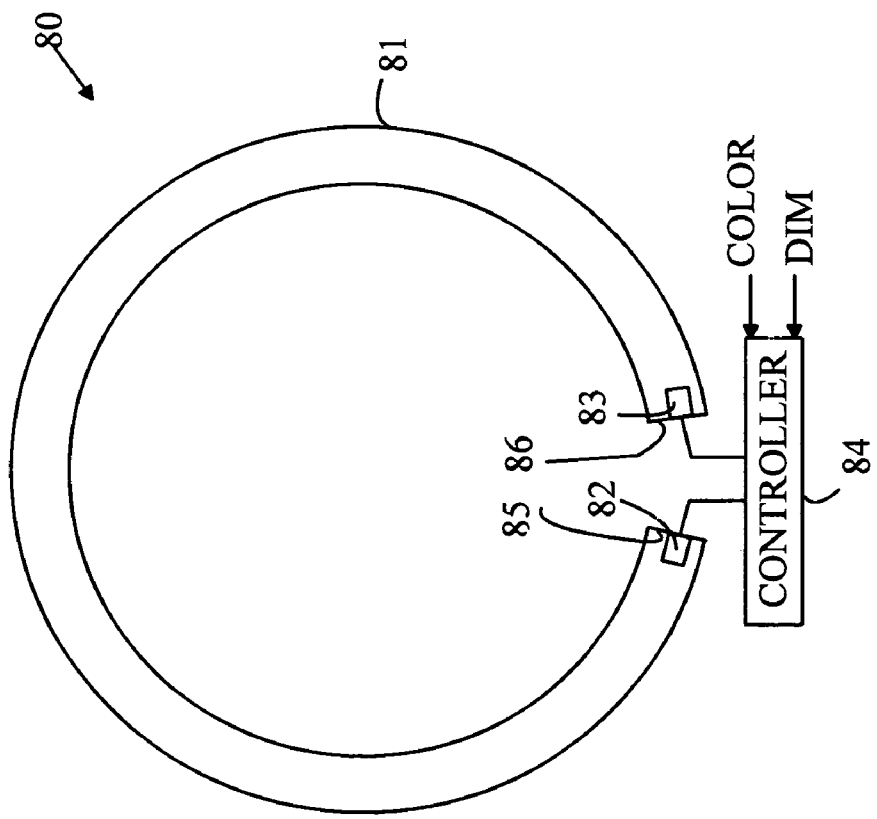

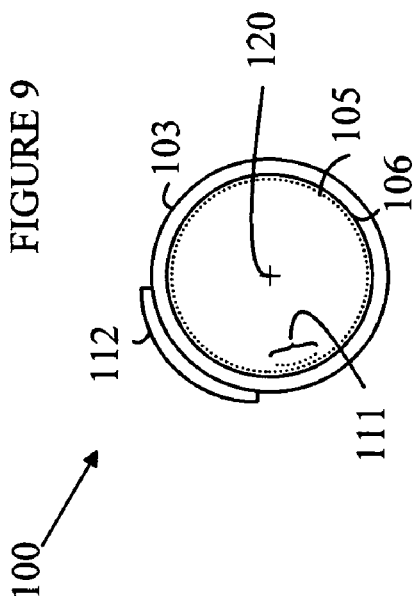
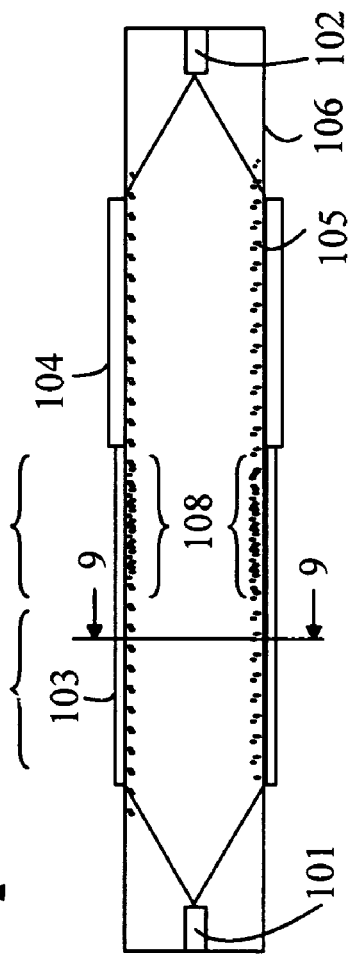
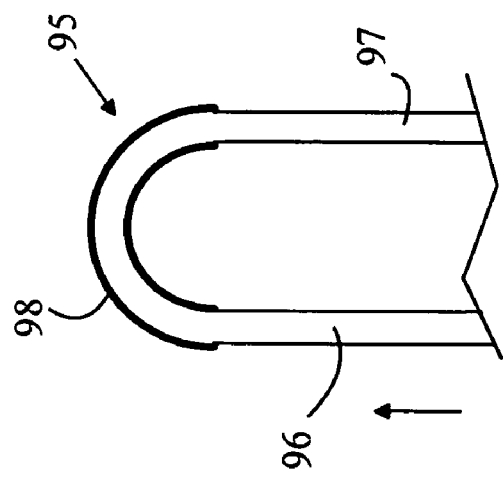

US 7,549,782 B2

SEMICONDUCTOR LIGHT SOURCE CONFIGURED AS A LIGHT TUBE

BACKGROUND OF THE INVENTION

Advances in light-emitting diodes (LEDs) have made light sources constructed from such devices attractive alternatives to conventional light sources such as fluorescent lights and incandescent lights. LED-based light sources have energy conversion efficiencies approaching or exceeding those of these conventional light sources. In addition, the LED-based light sources have lifetimes that far exceed those of these conventional light sources. For example, a fluorescent light source has a lifetime of about 10,000 hours whereas an LED has a lifetime of 100,000 hours. In addition, fluorescent light sources tend to fail completely without warning. In contrast, LED-based light sources tend to fade over time or shift in color, and hence, the user has adequate warning so that the light source can be replaced before it completely fails.

Fluorescent light sources are typically constructed from a glass tube containing a gas such as mercury vapor. The gas emits light in the UV range when the gas is excited by an alternating electric field created by applying a relatively high voltage between the ends of the tube. The UV light is converted to light of the desired spectrum by a layer of phosphor on the walls of the tube. Hence, the output light spectrum of fluorescent lights is limited to spectrums that can be produced by phosphors that can be excited with relatively high efficiency. In contrast, LED-based light sources can be constructed to generate a wide range of colors by utilizing a combination of LEDs of different colors.

Both the mercury vapor and fluorescent materials present environmental problems when inoperative fluorescent tubes must be replaced. In addition, these materials present personnel hazards when a tube is accidentally broken during replacement. Further, a fluorescent light requires a transformer to convert the conventional line voltages to the high voltages required to drive the fluorescent light. These transformers represent a significant cost and present fire hazards.

The amount of light generated per unit length of the tube in a fluorescent light fixture is approximately constant. Hence, fluorescent lights are typically either a long straight tube or a tube that is bent to provide an increased length in a smaller overall area. For example, tubes that are bent to form a ring are common. Furthermore, fluorescent light fixtures with adjustable intensities are difficult to construct, and hence, the user can only control the level of light in a room by turning on or off specific light fixtures.

Given the large installed base of fluorescent light fixtures and the advantages that are inherent in LEDs and other semiconductor light sources such as lasers, systems that are designed to replace existing fluorescent lights with semiconductor-based light are very attractive. For example, light sources that are constructed from a plurality of LEDs embedded in a plastic tube are known to the art. The LEDs are spaced along the length of the tube to provide an approximation to a linear light source that can be used to replace a fluorescent tube of the same geometry. Unfortunately, LEDs are inherently point light sources, and hence, these light sources appear as a string of bright "dots" rather than a uniformly illuminated tube. While the bright dots can be muted somewhat by including scattering material within or on the surface of the tube, the result is still a poor substitute for a fluorescent tube. In addition, LEDs emit light in a relatively narrow cone of angles, and hence, these light sources have intensities that vary with the viewing angle.

SUMMARY OF THE INVENTION

The present invention includes a light source having a semiconductor light source and a tube. The tube includes a transparent medium, the tube having a side tube surface, a center curve, one end surface, a length, and a maximum cross-sectional dimension. The tube includes scattering centers that cause light traveling in the tube to be reflected at angles such that the reflected light leaves the tube through the side tube surface. The semiconductor light source is positioned to emit light into the tube within a cone of angles such that the light will not leave the side tube surface in the absence of the scattering centers. The length of the tube is at least 10 times greater than the maximum cross-sectional dimension. The scattering centers can be dispersed in the transparent medium or located on the side tube surface. The transparent medium can be rigid or flexible. Light sources constructed from multiple tubes that are intertwined with one another and are illuminated with light having different optical spectra can also be constructed. The tubes can also include phosphorescent or fluorescent material that converts the light from the semiconductor light source to light having a different spectrum.

BRIEF DESCRIPTION OF THE DRAWINGS

FIG. 1 is a prospective view of a light source according to the present invention.

FIG. 2 is a cross-sectional view of light tube 50 shown in FIG. 1.

FIGS. 3, 4 and 5 are cross-sectional views of other embodiments of a light source according to the present invention.

FIG. 6 illustrates a light source according to another embodiment of the present invention.

FIG. 7 illustrates a portion of another embodiment of a light source according to the present invention.

FIG. 8 is a cross-sectional view of another embodiment of a light source according to the present invention.

FIG. 9 is a cross-sectional view of light source 100 through line 9-9 shown in FIG. 8.

DETAILED DESCRIPTION OF THE PREFERRED EMBODIMENTS OF THE INVENTION

For the purposes of this discussion, the term "tube" is defined to be the volume swept out by a planar area that is moved along a center curve such that the planar area is perpendicular to the center curve. The planar area is characterized by a boundary curve that defines the edge of the planar area in the plane and by a maximum cross-sectional dimension, which is the maximum distance between two points on the boundary curve. The tube is characterized by a side tube surface and optionally two end surfaces. The side tube surface is defined to be the locus of points swept out by the boundary curve as the planar area moves perpendicular to the curve. It should be noted that the planar area could vary as a function of position along the center curve. In general, the length of the tube, i.e., the maximum distance along the curve between two points on the curve, is at least 10 times the maximum cross-sectional dimension.

The manner in which the present invention provides its advantages can be more easily understood with reference to FIGS. 1 and 2, which illustrate a light source according to one embodiment of the present invention. FIG. 1 is a prospective view of light source 50, and FIG. 2 is a cross-sectional view of light source 50. Light source 50 includes an LED light source 51 and a tube 52. Tube 52 is constructed from a transparent medium that contains scattering particles 54. The light from light source 51 enters tube 52 at an angle 53 such that most of the light is incident on the walls of tube 52 at angles R that are greater than the critical angle, and hence, suffers total internal reflection. In the absence of the scattering particles 54, this light would remain trapped in tube 52 until it exited tube 52 at the end 57 opposite to that at which the light is injected by light source 52. Scattering particles 54 are dispersed in the tube at a density such that some of the light is scattered by the particles and strikes the wall of tube 52 at angles that are less than the critical angle. This light escapes tube 52 as shown at 55.

To maintain a substantially uniform brightness level as a function of the distance, x, along the tube, the density of scattering particles must increase as a function of x or the density of particles must be sufficiently low to assure that the amount of light lost in traversing the length of the tube is a small fraction of the light entering the tube. Consider the case in which a uniform density of scattering particles is used in the tube. The amount of light that exits at any distance along the tube is proportional to the intensity of light at that position. As light is lost by exiting the tube through the side surface of the tube, the intensity decreases. If the density of particles is low, the intensity appears uniform because the decrease in intensity is not noticeable to a human observer. Unfortunately, in this case, most of the light exits the end of the tube, and hence, the efficiency of the tube in terms of converting electricity to light that is viewed by an observer is low.

The efficiency of the tube can be increased by recycling the light that would otherwise exit the tube through the ends. For example, end 57 of the tube could be coated with a reflective material to direct the light that would exit end 57 back into the tube. However, a single reflective coating only provides a partial solution to the efficiency/uniformity problem. In addition, a second light source could be placed at the end 57 of the tube.

Refer now to FIG. 3, which is a cross-sectional view of another embodiment of a light tube according to the present invention. Light source 60 includes a tube 62 having scattering particles therein that operates in a manner analogous to that of tube 52 discussed above. Light source 60 uses two LED-based light sources 63 and 64 to illuminate the interior of the tube. In this embodiment, LED light sources 63 and 64 are embedded in the material from which tube 60 is constructed. In addition, the ends 65 and 66 are planar and covered with a reflective material so that light reaching the ends is reflected back into tube 62. If the portion of the end tube area covered by LEDs 63 and 64 is a small fraction of the surface area of ends 65 and 66, then most of the light that is not reflected out of tube 62 in any given pass through tube 62 will be recycled. Accordingly, this embodiment provides high efficiency without reducing the uniformity of illumination.

In the above-described embodiments, the scattering particles were distributed uniformly within the material of the light tube. However, embodiments in which the scattering centers are located on the surface of the light tube can also be constructed. Refer now to FIG. 4, which is a cross-sectional view of another embodiment of a light source according to the present invention. Light source 70 differs from light source 60 in that the scattering centers 73 are located on the walls of tube 72 instead of being dispersed within the material from which the tube is constructed. The scattering centers can be provided by molding imperfections into the walls of tube 72. Since the scattering center distribution is determined by a mold or other surface treatment, the density of scattering centers can be controlled as a function of the distance from one end of tube 72. Consider a tube in which the density of scattering centers is uniform. If that tube displays a non-uniform light distribution, the problem can be corrected by increasing the density of scattering centers in regions that emit insufficient light.

In the above mentioned embodiment, the LEDs are embedded into the ends of the tube. However, the LEDS could also be placed adjacent to, and touching, the ends of the tube. Surfaces 65 and 66 can still be constructed to have a reflective property.

The color of light emitted by the light sources described above is determined by the color of light emitted by the LED light sources used therein. These light sources can be constructed from a plurality of individual LEDs having different emission spectra. If the relative intensities of the various LEDs are controlled, the tube can be made to emit light that is perceived by a human observer as being almost any color, even though the emission spectrum of any particular LED is very narrow.

Alternatively, the LED light sources can provide light of a single color and the scattering centers can be replaced by phosphors that convert the LED light to light of a spectrum determined by the phosphors included in the tube. For example, a light source comprising one or more LEDs that emit in the UV or blue portion of the spectrum may be used to excite a mixture of phosphors to provide light of a particular spectrum. The phosphors can be in the form of particles that are dispersed in the material of the tube or the phosphors chosen from the class of phosphors that are soluble in the material from which the tube is constructed. Since the phosphors are contained within the medium from which the tube is manufactured, the environmental and health risks associated with the phosphors in fluorescent tubes when the tubes are broken are avoided.

It should also be noted that, unlike fluorescent light sources, the intensity of light from the light source can be varied by varying the intensity of light from the LEDs. The perceived light intensity from the LEDs can be varied by altering the current through the LEDs or by varying the duty cycle of the LEDs. In the later scheme, each LED is cycled on and off over a time period that is too small to be perceived by a human observer. The perceived intensity of light is determined by the fraction of the time over which the LED is turned on during a given cycle.

The above-described embodiments of the present invention have utilized a linear tube geometry of a type similar to that of a conventional linear fluorescent tube. However, other geometries can be utilized. For example, one class of fluorescent light fixtures utilizes a tube that is bent in a circular configuration. The present invention can be utilized to provide a similar geometry. Refer now to FIG. 5, which is a cross-sectional view of another embodiment of a tubular light source according to the present invention. Light source 80 is constructed from a tube 81 that is bent into a circular configuration. The tube is illuminated by two LED light sources 82 and 83 that inject light into the tube at the two ends shown at 85 and 86. The ends can include a reflective material to effectively recycle any light that is not directed out of the tube. Alternatively, the two ends can be butted together such that any light leaving one end of the tube enters the other end of the tube. Light sources 82 and 83 include a plurality of LEDs that emit light in different wavelength bands. The color of light source 80 and the intensity of light emitted therefrom are determined by signals that are input to a controller 84. Tube 81 can utilize any of the scattering particle configurations discussed above. For example, the scattering particles can be incorporated in the material from which tube 81 is constructed.

The radius of curvature of tube 81 must be greater than the radius of curvature at which a significant fraction of the light would strike the walls of tube 81 at angles that are less than the critical angle. If the radius of curvature is too small, light will be lost from the sides of the tube when the light is reflected from the sides of the tube. The minimum radius of curvature will depend on the specific material from which tube 81 is constructed.

The tubes utilized in the above-described embodiments can be constructed from any transparent medium. The medium can be rigid or flexible. In applications directed to replacements for conventional fluorescent light fixtures, rigid materials are preferred, as many of the existing fixtures for such light sources assume that the tube is self-supporting. However, more decorative light sources can be constructed using flexible tubes.

Refer now to FIG. 6, which illustrates a light source according to another embodiment of the present invention. Light source 90 is constructed from two flexible tubular light sources 91 and 92 of the type discussed above that are braided to form a helical light source in which each tube emits a different color of light. It should also be noted that such tubular light sources could be bent around various objects to provide light sources that have a wide variety of shapes.

As noted above, when a light source according to the present invention includes a bend having a radius of curvature less than a critical value, light will be lost at that bend because light can leave the tube through the walls of the tube. Refer now to FIG. 7, which illustrates a portion of another embodiment of a light source according to the present invention. The light source has a bend 95 that has a radius of curvature that is less than the critical radius discussed above. As a result, a light signal moving from region 96 to region 97 would suffer a significant decrease in intensity due to the losses incurred when the signal is reflected within the light tube while traversing the curved section. This would result in the intensity of light leaving region 97 being significantly less than the intensity of light leaving region 96 while the intensity of light leaving the region of the bend would be significantly greater than that in region 96. This problem can be reduced by providing a reflective coating 98 in the bend region. The coating redirects light leaving the tube back into the tube, and hence, reduces the loss from non-critical reflections in the bend. If the particular application does not require region 95 to omit light, this coating can be a completely reflective coating. If, however, some light is to leave the bend region, a partially reflective coating can be utilized.

As noted above, a phosphor can be utilized to provide the function of the scattering particles and to set the color of the light that is emitted from the light tube. If a phosphor converted light tube also has scattering particles or protrusions, then the phosphors can be placed on the outside of the light tube. To provide a light source of one color that is uniform in intensity, the phosphor coating is applied in a uniform layer on a tube that has a uniform distribution of scattering centers. However, in some applications, it is advantageous to have a light tube in which the color and/or intensity of light changes at various locations on the tube to provide a decorative effect. A light tube that emits light of different colors along its length can be constructed by changing the composition of the phosphor along the length of the tube. Similarly, by altering the thickness of the phosphor along the tube, the intensity of light emitted along the tube can be altered. In addition, the density of scattering centers along the length of the tube can be varied to alter the intensity distribution along the tube.

Refer now to FIG. 8, which is a cross-sectional view of another embodiment of a light source according to the present invention. Light source 100 includes a transparent tube 106 having scattering centers 105 along the surface of the tube. The scattering centers include indentations that are formed by applying a mold to the outer surface of the tube either when the tube is molded or after the tube is formed. The tube is illuminated with two light sources 101 and 102 that provide light of a wavelength that excites two layers of phosphor shown at 103 and 104 that have different output spectra. In addition, layer 104 is thicker than layer 103, and hence, provides a different intensity of light. The difference in intensity can be the result of additional light being converted in the thicker layer or some of the converted light being absorbed. If the excitation wavelengths are in the visible range and the phosphor layers are thin enough to allow some of the excitation light to escape, the color emitted by each region reflects both the phosphor spectrum and the underlying excitation spectrum. For example, it is known that a light source that appears to be white to the human eye can be constructed by using a blue light source with a layer of phosphor than converts part of the blue light to yellow light.

Light source 100 also includes a region 108 in which the density of scattering centers is greater than in the surrounding regions. Hence, more of the excitation light will be scattered out of tube 106 in this region, and hence, the tube will appear brighter in region 109 than in region 107. As noted above, the density of scattering centers is controlled by the pattern on a mold or stamp that is used to form the outer skin of tube 106.

Refer now to FIG. 9, which is a cross-sectional view of light source 100 through line 9-9 shown in FIG. 8. In the embodiments discussed above, it was assumed that the distribution of scattering centers as a function of angle around the center 120 of tube 106 was constant so that the tube provided a uniform light tube that was well adapted to replacing a fluorescent tube of a similar shape. However, when more decorative light sources are required, the density of scattering centers or the thickness and/or the composition of the phosphor layers can be varied as a function of angle. For example, the phosphor layer may include a region 112 having a different thickness or composition. Similarly, the density of scattering centers can be altered in a region such as region 111.

In the embodiments discussed above, the tube has a circular cross-section of constant radius as a function of distance along the length of the tube. In general, the cross-section of the tube should be constant along the length of the tube to provide uniform illumination as a function of the distance from the ends of the tube. It is also substantially easier, and hence, less expensive, to manufacture tubes having a constant cross-sectional area since the tube can be formed by an extrusion process. If the distribution of light with respect to the angle around the center of the tube does not need to be uniform, the cross-section does not need to be circular.

As noted above, the tube can be constructed of any suitable transparent material. If the tube is to be rigid, plastic or epoxy materials are preferred. For flexible tubes an elastomeric material that can be bent into various shapes is preferred. For example, polyurethane could be utilized.

Various modifications to the present invention will become apparent to those skilled in the art from the foregoing description and accompanying drawings. Accordingly, the present invention is to be limited solely by the scope of the following claims.

What is claimed is:

1. A light source comprising:
a semiconductor light source;
a tube comprising a transparent medium, said tube having a side tube surface, a center curve, one end surface, a length, and a maximum cross-sectional dimension, said tube having scattering centers that cause light traveling in said tube to be reflected at angles such that said reflected light leaves said tube through said side tube surface;

said semiconductor light source being positioned to emit light into said tube within a cone of angles such that said light will not leave said side tube surface in the absence of said scattering centers, wherein said length is greater than 10 times said maximum cross-sectional dimension;

wherein said scattering centers are dispersed throughout said transparent medium; and phosphorescent material located at each of said scattering centers.

2. The light source of claim 1 wherein said end surface comprises a reflective material for reflecting light striking said end surface back into said tube.

3. The light source of claim 1 wherein said center curve comprises a portion of a circle.

4. The light source of claim 1 wherein said center curve comprises a straight line.

5. The light source of claim 1 wherein said transparent medium comprises an elastomeric material.

6. The light source of claim 1 wherein said semiconductor light source comprises an LED.

7. The light source of claim 1 wherein said semiconductor light source comprises a laser.

8. The light source of claim 1 wherein said scattering centers are dispersed such that said light leaving said side tube surface has a substantially uniform intensity as a function of position along said center curve.

9. The light source of claim 1 wherein said tube comprises first and second ends and wherein said semiconductor light source comprises a first light emitter that injects light into said first end and a second light emitter that injects light into said second end.

10. The light source of claim 1 further comprising a controller that sets an intensity of light emitted by said semiconductor light source in response to an externally generated intensity control signal.

11. The light source of claim 10 wherein said controller controls the spectrum of light emitted from said semiconductor light source in response to an externally generated color control signal.

12. The light source of claim 1 wherein said scattering centers are distributed uniformly throughout said transparent medium.

13. The light source of claim 1 and further wherein:

said phosphorescent material converts light from said semiconductor light source to light having a different spectrum from that emitted by said semiconductor light source.

14. The light source of claim 1 and further wherein:

said scattering centers comprise at least a first plurality of scattering centers and a second plurality of scattering centers;

said phosphorescent material comprises a first type of phosphor and a second type of phosphor;

said first type of phosphor is located at each of said first plurality of scattering centers; and said second type of phosphor is located at each of said second plurality of scattering centers.

15. The light source of claim 14 and further wherein:

said first type of phosphor converts light from said semiconductor light source to light having a first spectrum which is different from the spectrum of light emitted by said semiconductor light source; and said second type of phosphor converts light from said semiconductor light source to light having a second spectrum which is different from said first spectrum and which is different from said spectrum of light emitted by said semiconductor light source.

* * * * *